US007971334B2

(12) United States Patent
Walsh et al.

(10) Patent No.: US 7,971,334 B2
(45) Date of Patent: Jul. 5, 2011

(54) BLADED DISK ASSEMBLY METHOD AND ROLLER DEVICE

(75) Inventors: Leonard M. Walsh, Plainville, CT (US); Ranjan Kumar, Windsor, CT (US); Robert T. Badin, Rockfall, CT (US); Gregory Warner, Feeding Hills, MA (US)

(73) Assignee: United Technologies Corporation, Hartford, CT (US)

( * ) Notice: Subject to any disclaimer, the term of this patent is extended or adjusted under 35 U.S.C. 154(b) by 966 days.

(21) Appl. No.: 12/009,715

(22) Filed: Jan. 22, 2008

(65) Prior Publication Data

US 2009/0183349 A1 Jul. 23, 2009

(51) Int. Cl.
*B23P 11/00* (2006.01)

(52) U.S. Cl. ............. 29/509; 29/23.51; 29/785; 29/790; 29/889.21; 269/40; 269/55; 269/296

(58) Field of Classification Search ................. 29/23.51, 29/889.21, 509, 785, 790; 220/690; 269/40, 269/55, 296
See application file for complete search history.

(56) References Cited

U.S. PATENT DOCUMENTS 1,269,144 A * 6/1918 Williamson .............. 29/889.21
2,821,778 A * 2/1958 Wilken .......................... 269/40
4,798,520 A 1/1989 Partington et al.
4,884,951 A 12/1989 Meylan et al.
6,061,886 A 5/2000 Nita et al.

* cited by examiner

*Primary Examiner* — Rick K Chang
(74) *Attorney, Agent, or Firm* — Kinney & Lange, P.A.

(57) ABSTRACT

A bladed disk assembly device having a horizontal adjustable arm and a vertical pivot bar that is perpendicularly attached to a first end of the horizontal arm. A roller assembly is attached to a second end of the horizontal arm. A rotary table holds a disk that is circumvented by a blade positioning belt around an outer diameter of the turbine disk. A saddle is attached to the vertical pivot bar that is positioned beneath the disk.

17 Claims, 3 Drawing Sheets

BLADED DISK ASSEMBLY METHOD AND ROLLER DEVICE

CROSS REFERENCE TO RELATED APPLICATIONS

This application discloses subject mater related to copending U.S. patent application entitled, "BLADED DISK ASSEMBLY METHOD AND IMPACT DEVICE", application Ser. No. 11/703,988.

BACKGROUND OF THE INVENTION

1. Field of the Invention

The present disclosure relates to assembly of bladed disks. More specifically, the present disclosure relates to an assembly device that installs shrouded or other high aspect ratio blades in a turbine or compressor disk.

2. Description of Related Art

The blades of turbine disks have blade roots that are installed into broach slots on the outside diameter of the turbine disk. The blades have a curved airfoil portion extending radially outward from the blade root and a shroud on the distal end of the airfoil portion. When the blades are installed in the turbine disk, the shrouds on the ends of the blades abut with the shrouds of adjacent blades, which increases damping and thereby reduces blade flutter. But, the shrouded blade design makes the blades difficult to install because they are designed to twist when being seated into place.

The installation of shrouded blades in a turbine disk is traditionally accomplished by hammering the roots of the blades into the turbine disk with a plastic mallet. The roots of the blades are seated in the disk by hammering them down into the broach slots, which may be configured in a fir tree shape. The blades are driven into the broach slots in a circular manner around a table/wheel that holds the turbine disk in place while the blades are installed. This is compounded many times by seal strip materials on the inner shrouds of the blades. This method of installation of turbine blades is relatively time consuming.

Additionally, physically hammering the blades can damage the blades themselves and other parts of the turbine disk. For example, when blades are manually hammered into the disk, the depth of penetration of the blade root into the broach slots is not controlled and blade roots can bind, jam or be positioned improperly.

Accordingly, there is a need for a turbine blade assembly device to install shrouded blades into a turbine disk that provides positive control of the engagement between the turbine blade root and the broach slot on the turbine disk. A device is needed that ensures the blade is angled properly to prevent binding of the blade roots and does not require hammering.

SUMMARY OF THE INVENTION

The present disclosure provides a turbine blade assembly device having a horizontal adjustable arm and a vertical pivot bar that is perpendicularly attached to a first end of the horizontal arm. A roller assembly is attached to a second end of the horizontal arm. A rotary table holds a turbine disk that is circumvented by a blade positioning belt around an outer diameter of the turbine disk. A saddle is attached to the vertical pivot bar that is positioned beneath the turbine disk.

The above-described and other features and advantages of the present disclosure will be appreciated and understood by those skilled in the art from the following detailed description, drawings, and appended claims.

DETAILED DESCRIPTION OF THE INVENTION

Figure 1:
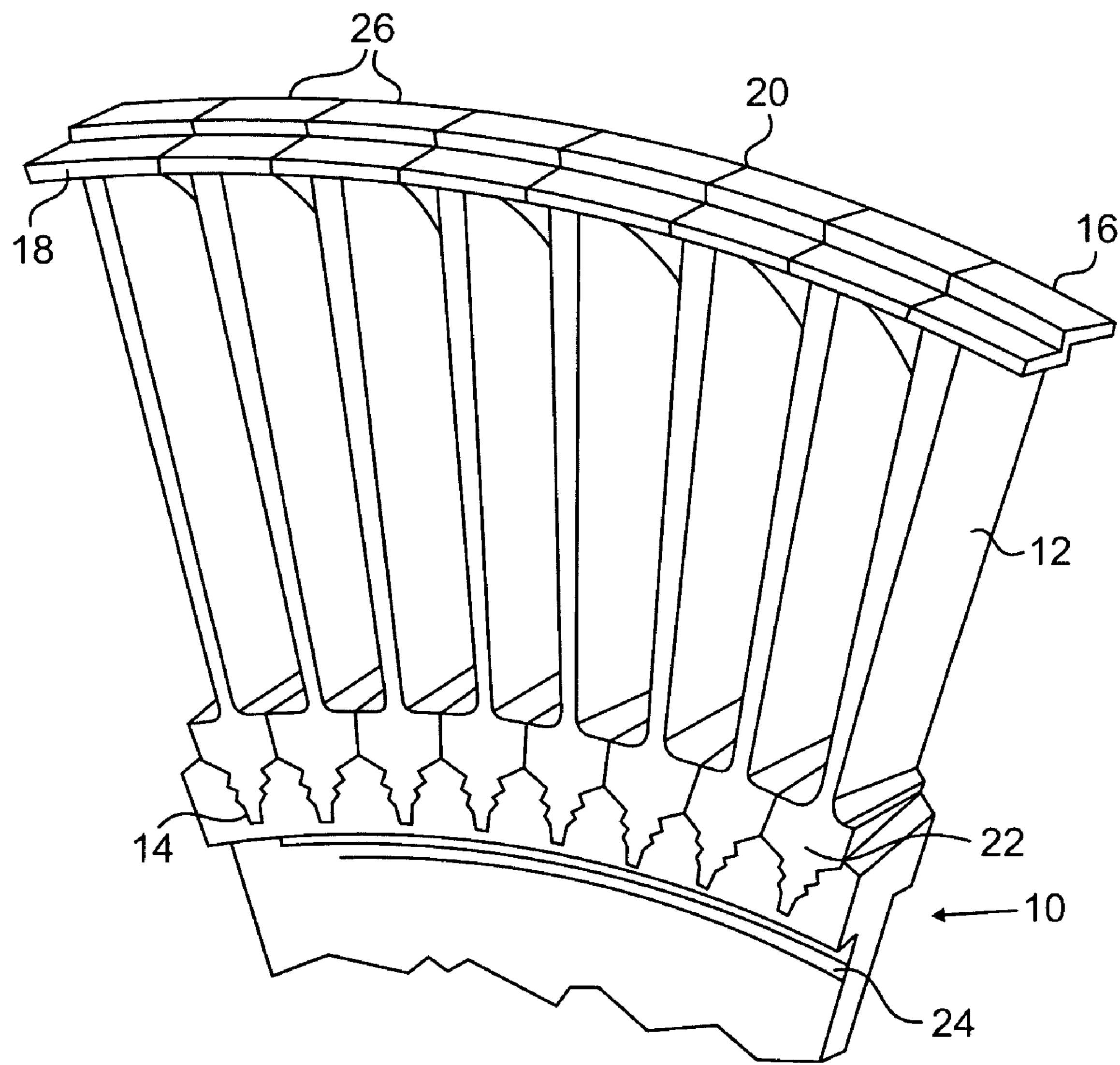
FIG. 1 illustrates a partial perspective view of a turbine disk with shrouded turbine blades installed according to the present disclosure.

Referring now to the drawings and in particular to FIG. 1, a turbine disk generally referred to by reference number 10 is shown. Turbine disk 10 has a plurality of shrouded turbine blades 12 installed thereon. Turbine disk 10 has an outer rim 24 that receives a blade root 22 of turbine blade 12. Turbine disk 10 has a plurality of broach slots 14 in the outer rim 24 that receive the blade root 22 of turbine blade 12. Each turbine blade 12 has an abutting outer shroud 26 on the distal end 18 of turbine blade 12. The outer shrouds 26 are commonly referred to as a z-notch 20 and overlap when viewed in the axial direction.

Figure 2:
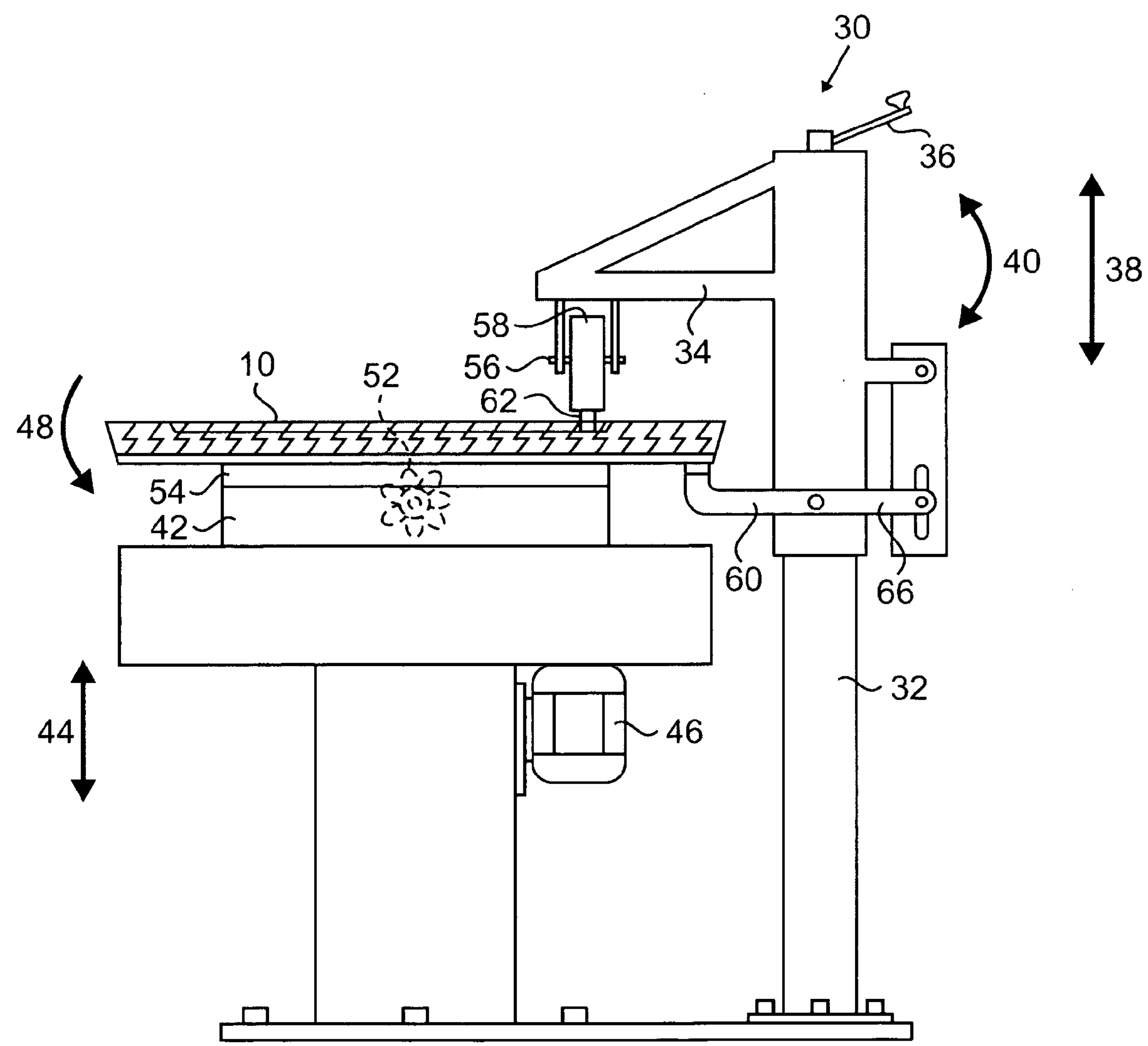
FIG. 2 illustrates a perspective view of a turbine blade assembly device positioned to install shrouded turbine blades into a turbine disk according to the present disclosure.
Figure 3:
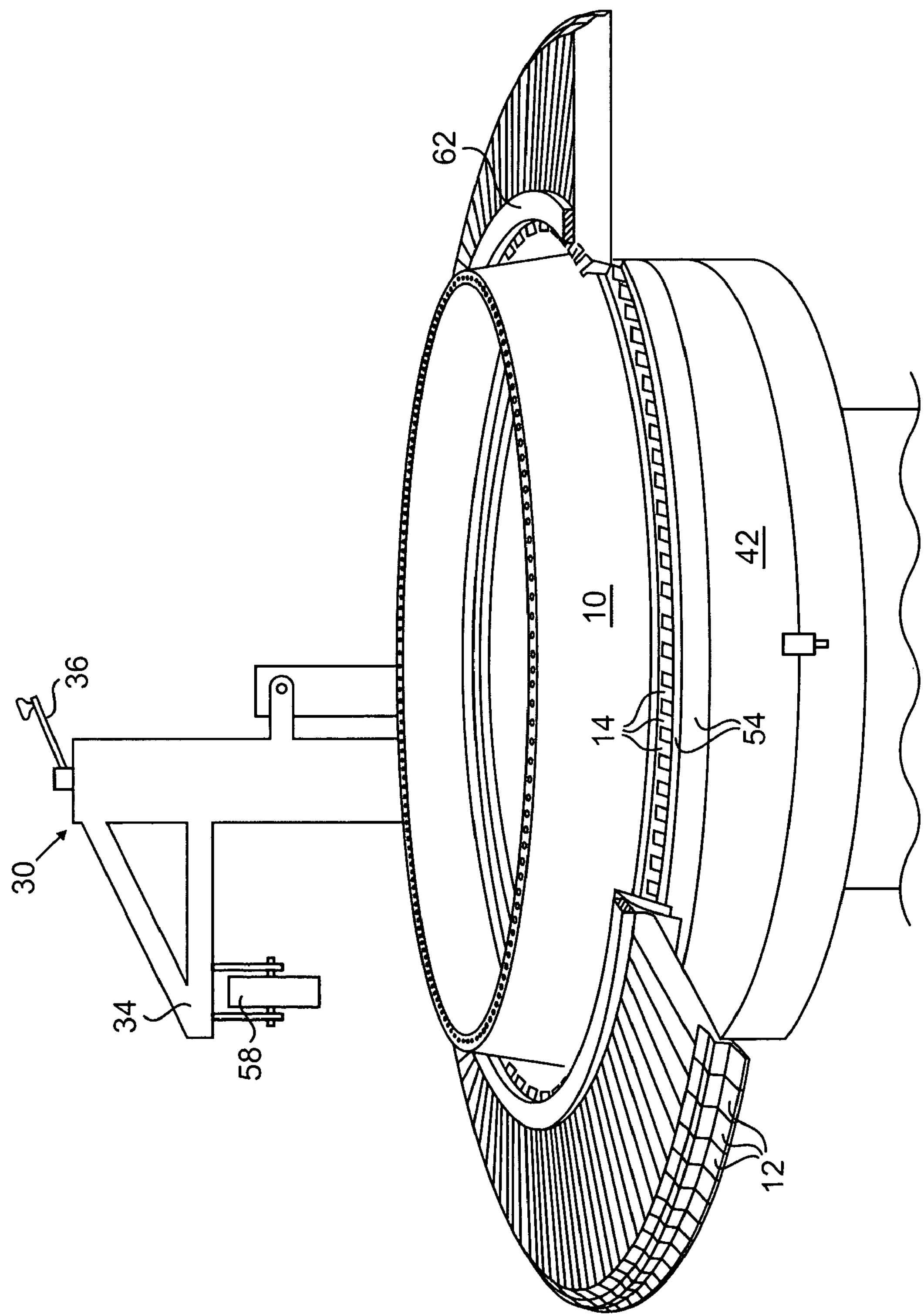
FIG. 3 illustrates another perspective view of the turbine blade assembly device of FIG. 2.

Referring now to FIGS. 2 and 3, a turbine blade assembly device according to the present disclosure is shown, generally referred to by reference number 30. Assembly device 30 has a fixed vertical pivot bar 32 mounted to the ground outside of the turbine disk 10. Vertical pivot bar 32 is perpendicularly attached to a horizontal adjustable arm 34 via an adjustable pivoting yoke mechanism 36. Pivoting yoke mechanism 36 allows for vertical height adjustment 38 and radial adjustment 40 of horizontal arm 34 to accommodate various size disks and to permit loading and unloading of the disk 10 onto a power rotary table 42 where the disk 10 is assembled.

Horizontal arm 34 can be segmented and can adjust and rotate with the use of wrist pins. Horizontal arm 34 can also have visual indicators that monitor the appropriate blade position.

In an exemplary embodiment, rotary table 42 is a lazy susan style table. Rotary table 42 is adjustable for height in a vertical direction 44. Table 42 has a motor 46 that rotates the table in a counterclockwise or clockwise direction 48 as viewed from the top. Table 42 has a pawl that can disengage the automatic rotation of table 42 for manual adjustment to prevent full seating of the blades if the blade shrouds bind. A center locating ring 52 is located in the center of table 42 that centers the turbine disk 10 on the table to accommodate disks with different diameters.

A blade positioning belt 54 circumvents the outer diameter of the turbine disk 10 and provides a rest for the blade roots 22 as they are initially pushed into the broach slots 14. Positioning belt 54 maintains a consistent position for each blade 12 relative to other blades in the disk 10 before they are fully installed into the slots 14. Positioning belt 54 has frictional contact with the disk 10 to prevent slipping initially, but it is fabricated such that it ensures no damage to the blades 12 or the disk 10 and so that it has the ability to slide down as the blades 12 are pushed downward. Positioning belt 54 can have tabs on the lower edge that are attached under the disk 10 to provide a proper alignment of the blades 12.

A roller assembly 56 is attached to horizontal arm 34 via a vertical acme screw that, together with the pivoting yoke mechanism 36, provides a large vertical force and incremental blade displacement without binding. Alternatively, a rack-and-pinion displacement system could be used. Roller assembly 56 slowly lowers a seating wheel 58 onto the blade roots 22, while the blades 12 are initially installed into the turbine disk 10. Seating wheel 58 gradually pushes the blades downward into the turbine disk broach slots 14 as the disk 10 is rotated on table 42 via motor 46. Roller assembly 56 is electrically activated to adjust radially and vertically but it may be disengaged to allow for manual adjustment as required. In an exemplary embodiment, a linear actuator is utilized to control roller assembly 56. Seating wheel 58 exerts equal pressure on the blade roots 22 to position them properly into the disk 10. The seating wheel is constructed of a non-marring material, for example urethane, to prevent damage to the blades 22 and the turbine disk 10.

A saddle 60 is attached to vertical pivot bar 32 via a radially and height adjustable ramp support 66. Saddle 60 is positioned beneath the turbine blade shrouds 26 to provide support and prevent the shrouds 26 from jamming when they are seated in the disk 10. Saddle 60 prevents the turbine blades 12 from sinking when the blade 12 is pushed into the broach slots 14. Saddle 60 can be adjusted to accommodate different blade/disk configurations. In the event of damage, saddle 60 can be easily replaced.

In an exemplary embodiment of turbine blade assembly device 30, saddle 60 is manufactured from either a plastic or nylon material and its contact face is crowned to help lift the blade tip 18 into position. The blade tips 18 are lifted into position via an upward tip action created either mechanically or electromechanically by saddle 60 that is simultaneous to the downward movement of seating wheel 58. The saddle 60 and the roller assembly 56 can be positioned independent of one another on the vertical pivot bar 32 or they can be synchronized to the rotation of table 42. Once the positions are set for a particular turbine disk size, the saddle 60 and roller assembly 56 must lower at the same rate as table 42 rotates. This method of seating the blades is particularly useful to help properly seat the blades 12 and prevent them from binding. The roller 58 also prevents damage to the blade root 22.

Turbine blade assembly device 30 can optionally utilize one or more reaction rings 62 installed around the top of the blade roots 22 to provide a bearing surface between seating wheel 58 and the upper surface of the turbine blade roots (in FIG. 3 a portion of the reaction ring 62 is omitted from the illustration). The reaction rings 62 can be constructed of nylon, plastic or rubber. The reaction rings 62 conform to the upper surface of the blade root 22 and the turbine disk 10 and provide pressure distribution and accurate control at the point where the seating wheel 58 contacts the disk 10.

Adapter rings, or stops, are used to secure the turbine disk to rotary table 42 and provide features to ensure the disk 10 is concentric with the table 42. Adapter rings must provide clearance for a sling fixture that is used to load and unload the disk 10 onto rotary table 42. A gage can be used to verify that the turbine disk 10 and the blade positioning belt 54 are properly positioned.

Turbine blade assembly device 30 can have a blade force indicator that measures the force required to fully seat the turbine blades 12. If the force exceeds a set maximum force, the blade force indicator automatically brings the rotation of table 42 to a halt and sounds an alarm indicating that the turbine blades 12 are locked and may require mechanic intervention. Alternatively, the blade force indicator may be a visual color indicator that signals when over pressurization of the blades begins 12 to occur.

Advantageously, turbine blade assembly device 30 installs turbine blades 12 into a turbine disk 10 without having to manually hammer each blade 12 into place. The device exerts a controlled amount of pressure on the blade roots 22 while providing positive control of the engagement between the turbine blade root 22 and the broach slots 14 at the rim 18 of the disk 10. Additionally, the device ensures a proper blade angle by providing a support beneath the blade shrouds 26 to prevent binding or blade damage.

The turbine blade installation method of the present disclosure simulates manual hammering using a rollerblade assembly device 30. A sling fixture is used to lift the turbine disk 10 onto, and off of, rotary table 42. The disk 10 is centered on the table 42 and secured using four adapter rings spaced about ninety degrees from one another. Blade positioning belt 54 is wrapped tightly around the outer diameter of the turbine disk 10 where the adapter rings are located. A gage or visual inspection can be used to verify proper belt location. The turbine blades 12 are positioned on the belt 54 without forcing them down so that the blade roots 22 are not fully engaged with the broach slots. This allows the outer shrouds 26 to be flexed into position, abutted and interlocked with the adjacent outer shrouds 26. The reaction rings 62 are installed around the top of the blade roots 22 to provide a bearing surface between seating wheel 58 and the upper surface of the turbine blade roots 22.

The turbine blade assembly device 30 is adjusted and positioned on top of the blade roots 22 (and reaction rings 62 if present). The roller assembly 56 slowly lowers seating wheel 58 onto the blade roots 22 (and reaction rings 62 if present). Seating wheel 58 gradually pushes the blade roots 22 downward into the turbine disk broach slots 14 as the disk 10 is rotated on table 42 by motor 46. As the blades roots 22 are pushed downward by seating wheel 58, the blade shrouds 26 are simultaneously lifted upward via an upward tip action created either mechanically or electromechanically by saddle 60. The saddle 60 and the roller assembly 56 can be positioned independent of one another on the vertical pivot bar 32 or they may be synchronized to counterclockwise, rotation of table 42. Once the positions are set for a particular turbine disk size, they must lower at the same rate as table 42 rotates.

While the present disclosure has been described with reference to one or more exemplary embodiments, it will be understood by those skilled in the art that various changes may be made and equivalents may be substituted for elements thereof without departing from the scope of the present disclosure. For example, blades installed into either compressor disks or turbine disks would benefit from the present device and method. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A device for installing blades into a slotted disk comprising:

a rotary table for supporting and providing rotary motion to the disk;

a horizontal adjustable arm;

a vertical pivot bar attached to a first end of said horizontal adjustable arm;

a roller assembly attached to a second end of said horizontal adjustable arm, said roller assembly engaging roots of the blades;

a saddle attached to said vertical pivot bar, said saddle positioned beneath and in contact with tips of the blades located opposite to the roots of the blades; and wherein, as the roller assembly and the saddle are lowered at the same rate and as the table is rotated, said roller assembly exerts downward force on the roots and the saddle exerts upward force on the tips, thereby seating the blades in the slots.

2. The device of claim 1, wherein said horizontal adjustable arm is attached to said vertical pivot bar via an adjustable pivoting yoke mechanism.

3. The device of claim 2, wherein said pivoting yoke mechanism provides for vertical height adjustment and radial adjustment of said horizontal adjustable arm.

4. The device of claim 1, further comprising a blade positioning belt that circumvents an outer diameter of the disk.

5. The device of claim 4, wherein said blade positioning belt maintains a consistent position amongst a plurality of blades on the disk.

6. The device of claim 1, wherein said rotary table is rotatable by a motor.

7. The device of claim 6, wherein said motor is disengageable to allow manual adjustment of said rotary table.

8. The device of claim 1, wherein said rotary table comprises a center locating ring to center the disk on said rotary table.

9. The device of claim 1, wherein said roller assembly comprises a seating wheel for contacting the blade roots.

10. The device of claim 1, wherein said roller assembly is electrically activated providing vertical height adjustment and radial adjustment.

11. The device of claim 10, wherein said roller assembly is disengageable to provide for manual adjustment.

12. The device of claim 1, wherein said saddle is comprised of a material selected from the group consisting of plastic, nylon and rubber.

13. The device of claim 1, further comprising a plurality of reaction rings, said rings installed between the root of the blades and the roller assembly.

14. The device of claim 1, further comprising a plurality of adapter rings to secure the disk to said rotary table.

15. The device of claim 1, wherein the disk is supported in a substantially horizontal orientation by the rotary table, and wherein said roller assembly is configured to radially align with the roots of the blades to exert the downward force substantially perpendicular to the disk.

16. A device for installing blades into a slotted disk, the device comprising:

a rotary table for supporting and providing rotary motion to the disk;

an adjustable arm;

a pivot bar attached to a first end of the adjustable arm; and a roller assembly attached to a second end of the adjustable arm, the roller assembly including a seating wheel configured to radially align with roots of the blades, wherein the seating wheel is rotatable about an axis arranged substantially parallel to the disk;

a saddle attached to the pivot bar, the saddle positioned beneath tips of the blades, wherein, as the roller assembly and the saddle are moved at the same rate and as the table rotates, the seating wheel is configured to exert a seating force on the roots and the saddle is configured to exert a supporting force on the tips, to seat the blades in the slots of the disk.

17. The device of claim 16 and further comprising:

a blade positioning belt that circumvents an outer diameter of the disk; and a reaction ring installed between the root of the blades and the seating wheel.

* * * * *